11 Sheets—Sheet 2.

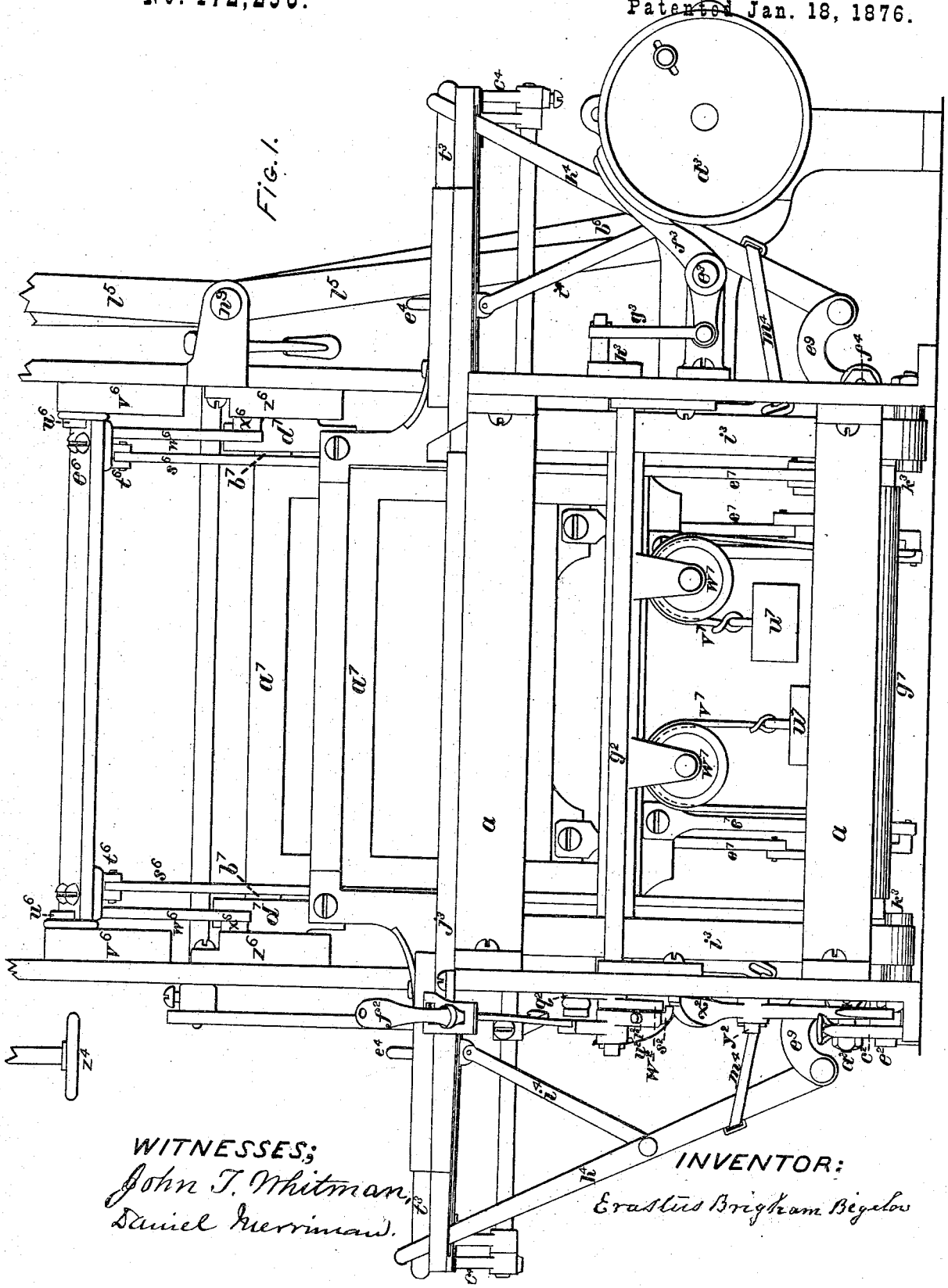

E. B. BIGELOW.
LOOM.

No. 172,296. Patented Jan. 18, 1876.

WITNESSES:
John T. Whitman
Daniel Merriman

INVENTOR:
Erastus Brigham Bigelow

11 Sheets—Sheet 3.

E. B. BIGELOW.
LOOM.

No. 172,296. Patented Jan. 18, 1876.

WITNESSES;
John T. Whitman.
Daniel Merriman.

INVENTOR; Erastus Brigham Bigelow.

E. B. BIGELOW.
LOOM.
No. 172,296.
11 Sheets—Sheet 4.
Patented Jan. 18, 1876.
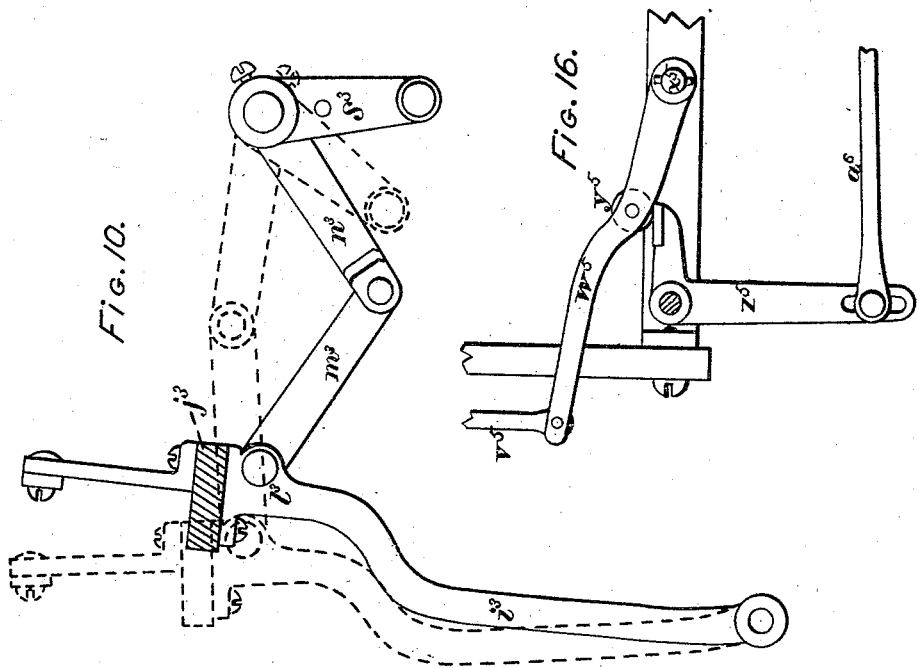
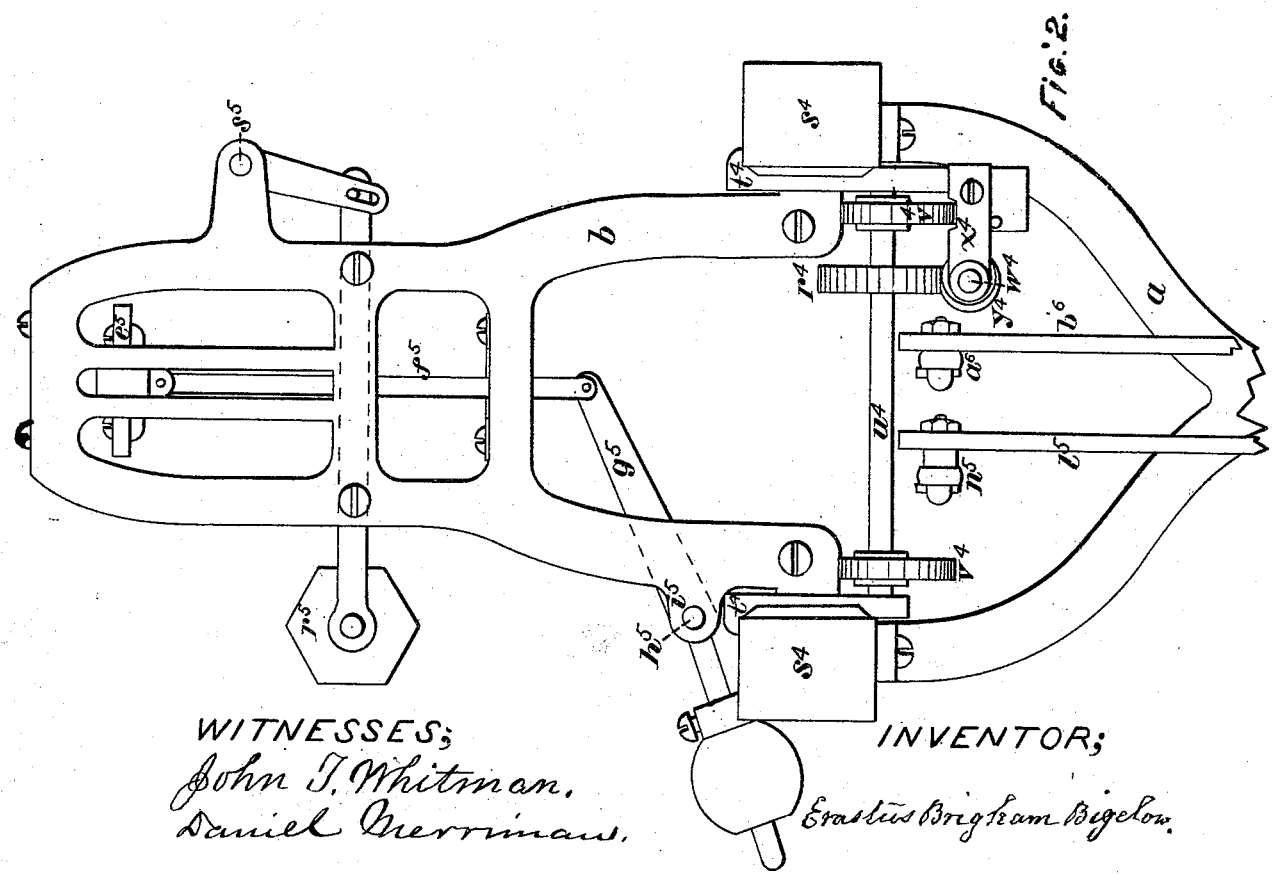
WITNESSES:
John T. Whitman.
Daniel Merriman.
INVENTOR:
Erastus Brigham Bigelow.

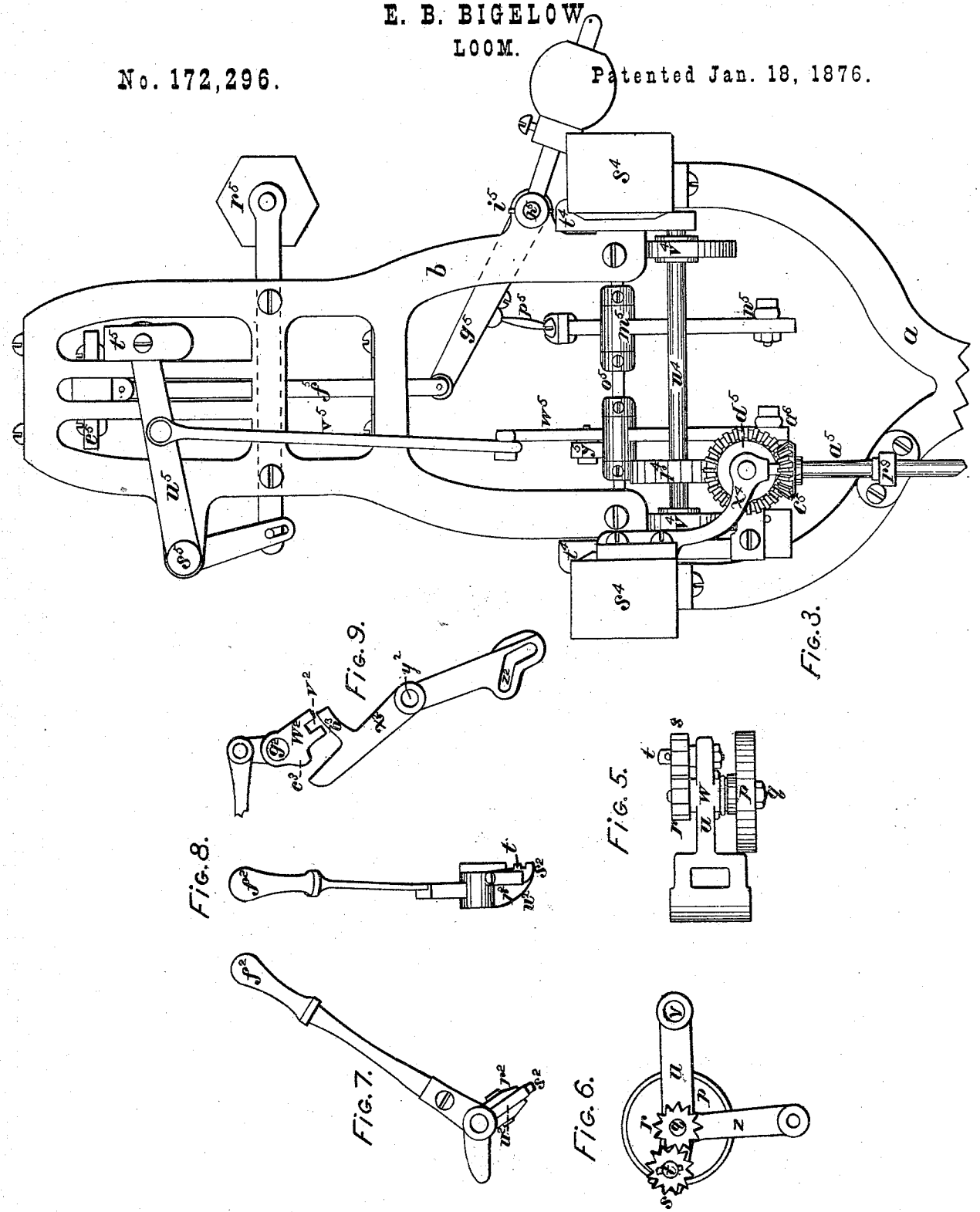

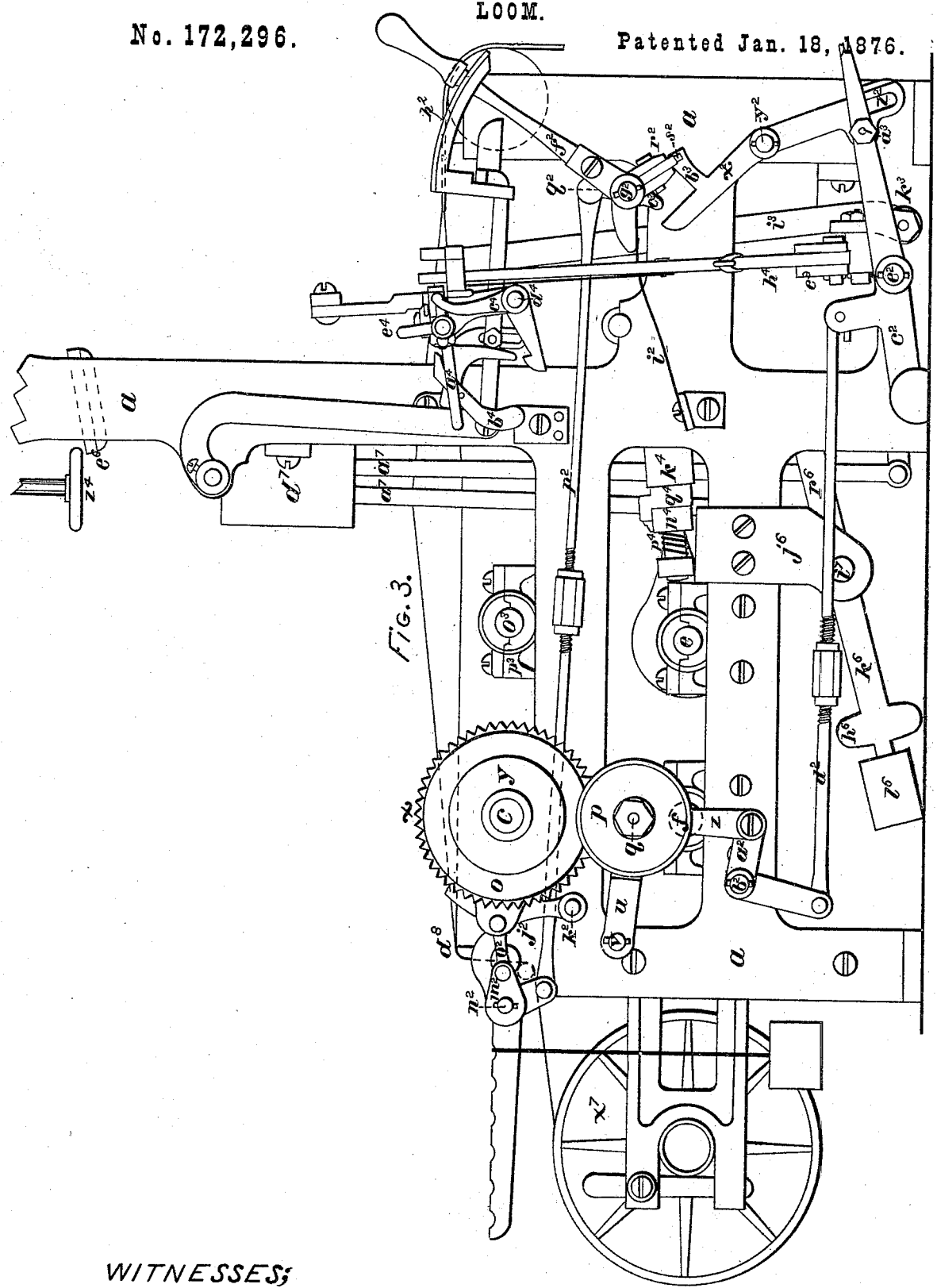

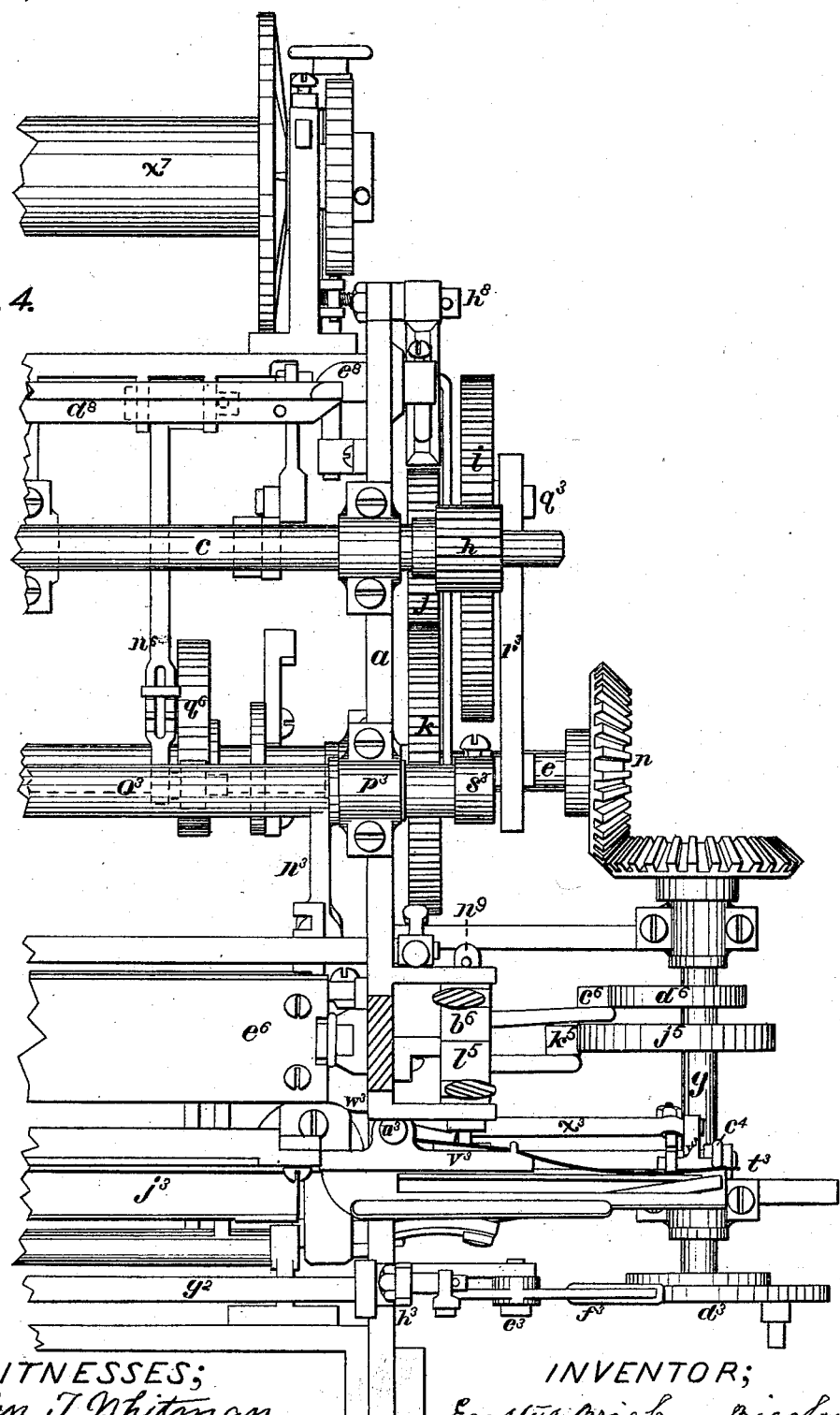

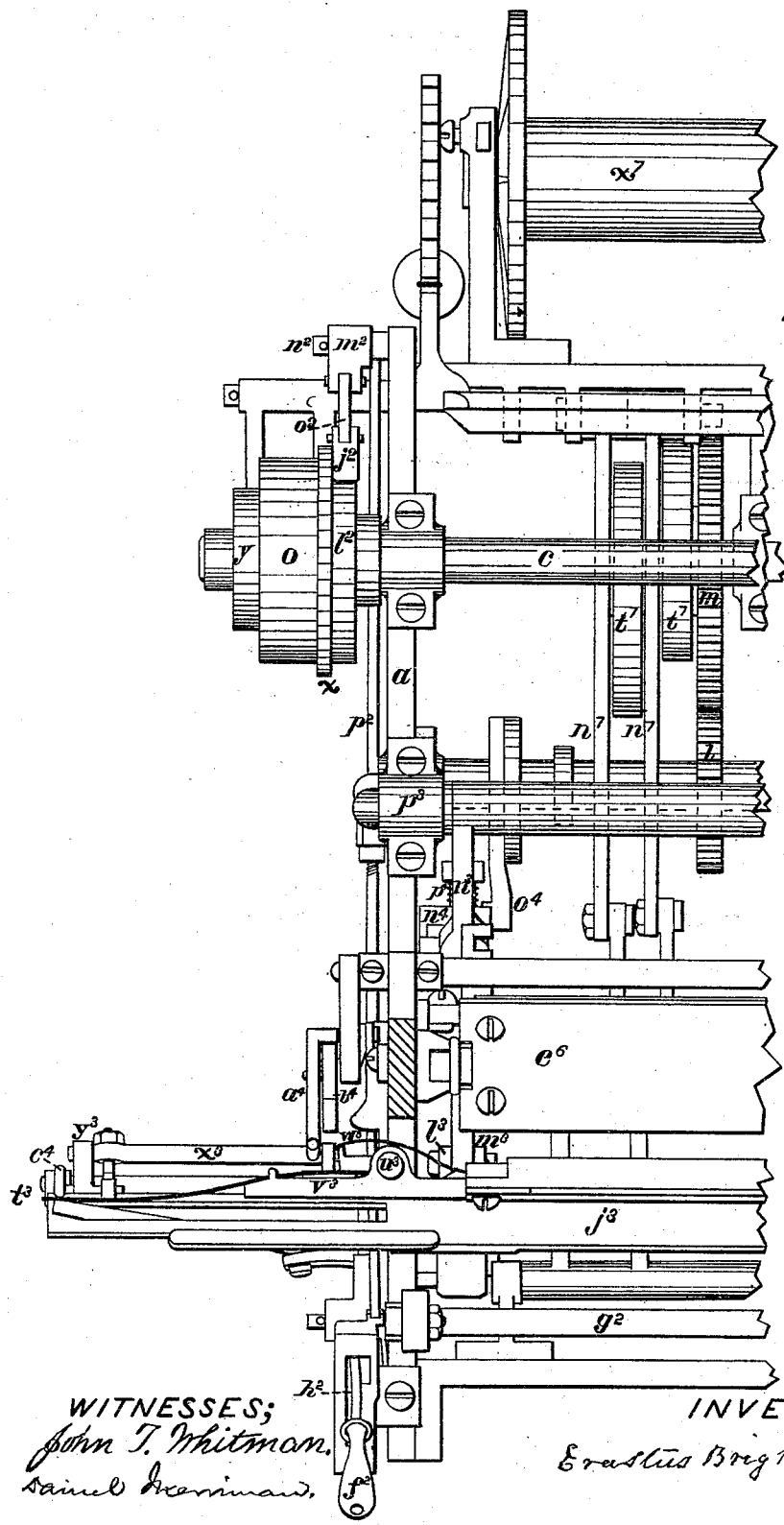

E. B. BIGELOW.
LOOM.
No. 172,296.
Patented Jan. 18, 1876.
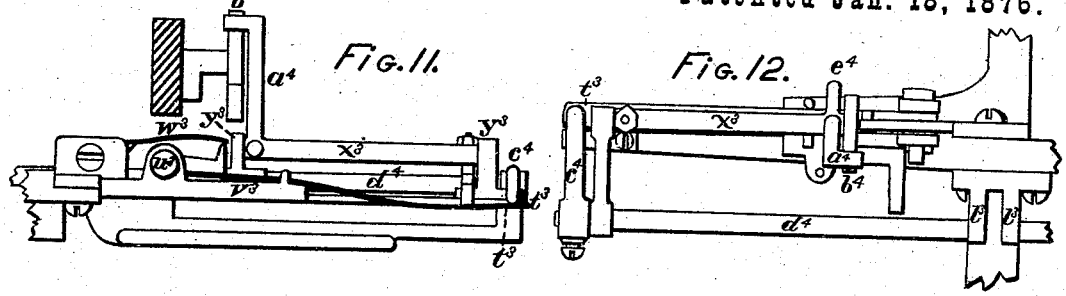
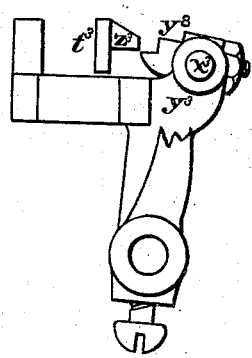
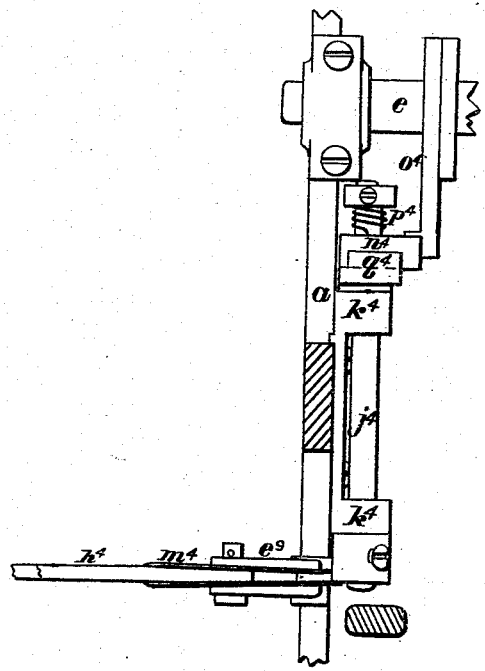
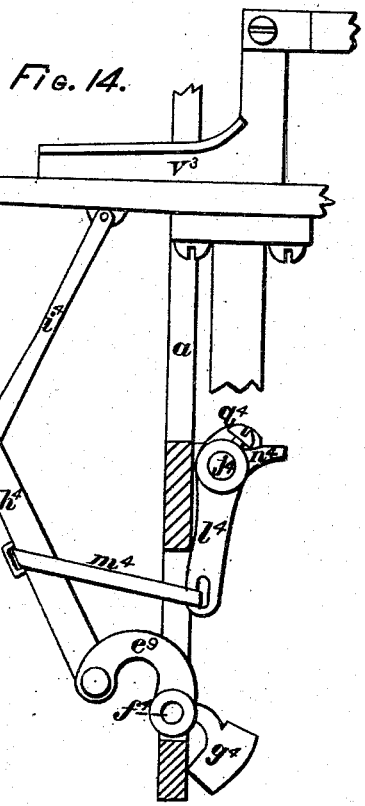
WITNESSES;
John T. Whitman.
Daniel Merriman.
INVENTOR;
Erastus Brigham Bigelow.

E. B. BIGELOW.
LOOM.
No. 172,296.
11 Sheets—Sheet 10.
Patented Jan. 18, 1876.
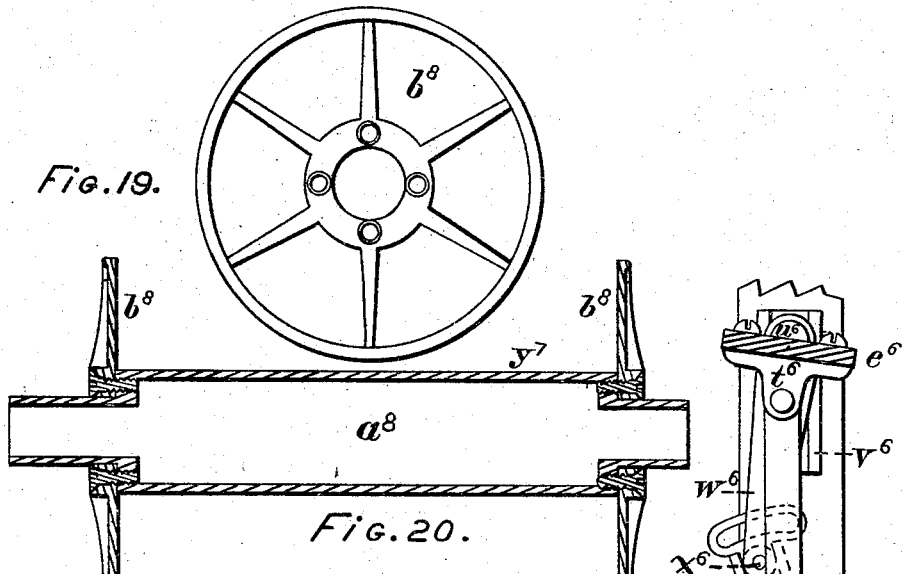
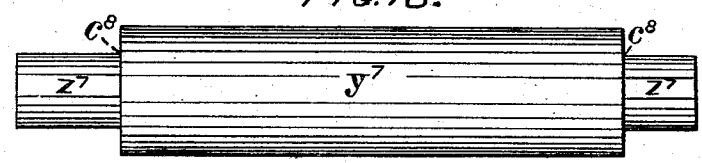
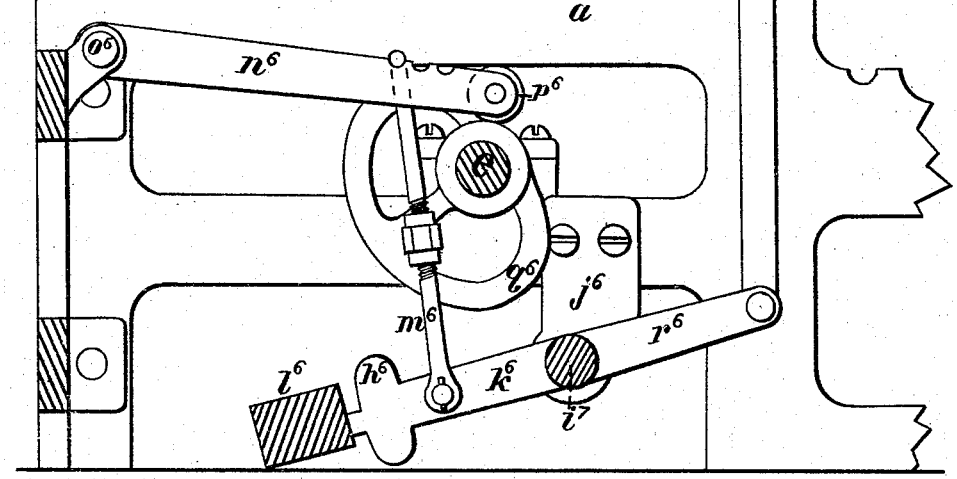
WITNESSES:
John T. Whitman
Daniel Merriman
INVENTOR;
Erastus Brigham Bigelow.

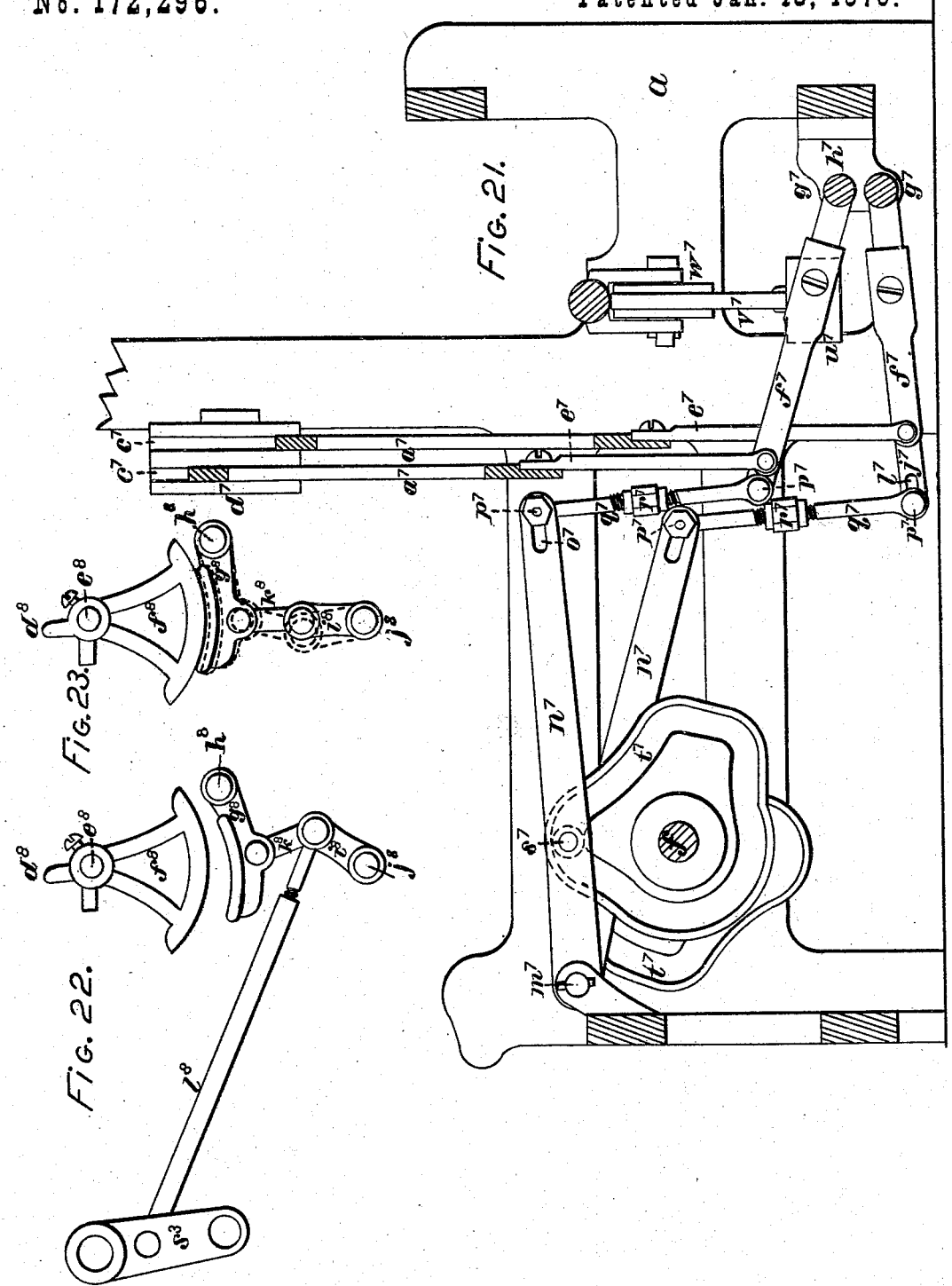

UNITED STATES PATENT OFFICE.

ERASTUS BRIGHAM BIGELOW, OF BOSTON, MASSACHUSETTS.

IMPROVEMENT IN LOOMS.

Specification forming part of Letters Patent No. 172,296, dated January 18, 1876; application filed August 16, 1875.

*To all whom it may concern:*

Be it known that I, ERASTUS BRIGHAM BIGELOW, of Boston, in the county of Suffolk and State of Massachusetts, have invented Improvements in Looms for Weaving Brussels Carpets and other fabrics, of which the following is a specification:

My invention is composed of several parts, which are related to the various operations of the loom, respectively, as follows, viz: to the mode of driving, reversing, and stopping the loom; the mode of operating the lay; the mode of constructing and of operating the shuttle-binder; the mode of operating the jacquard-machine, and of adjusting its elevation relative to the loom; the mode of operating the comber-board; the mode of operating the heddle-frames; and also to the mode of constructing and of operating the brake which holds the tension-bar rigid at the time the lay beats up the weft.

The accompanying drawings, which form a part of the specification, represent my improvements, and such other parts of the loom as are necessary to illustrate their construction and operation.

Figure 1:
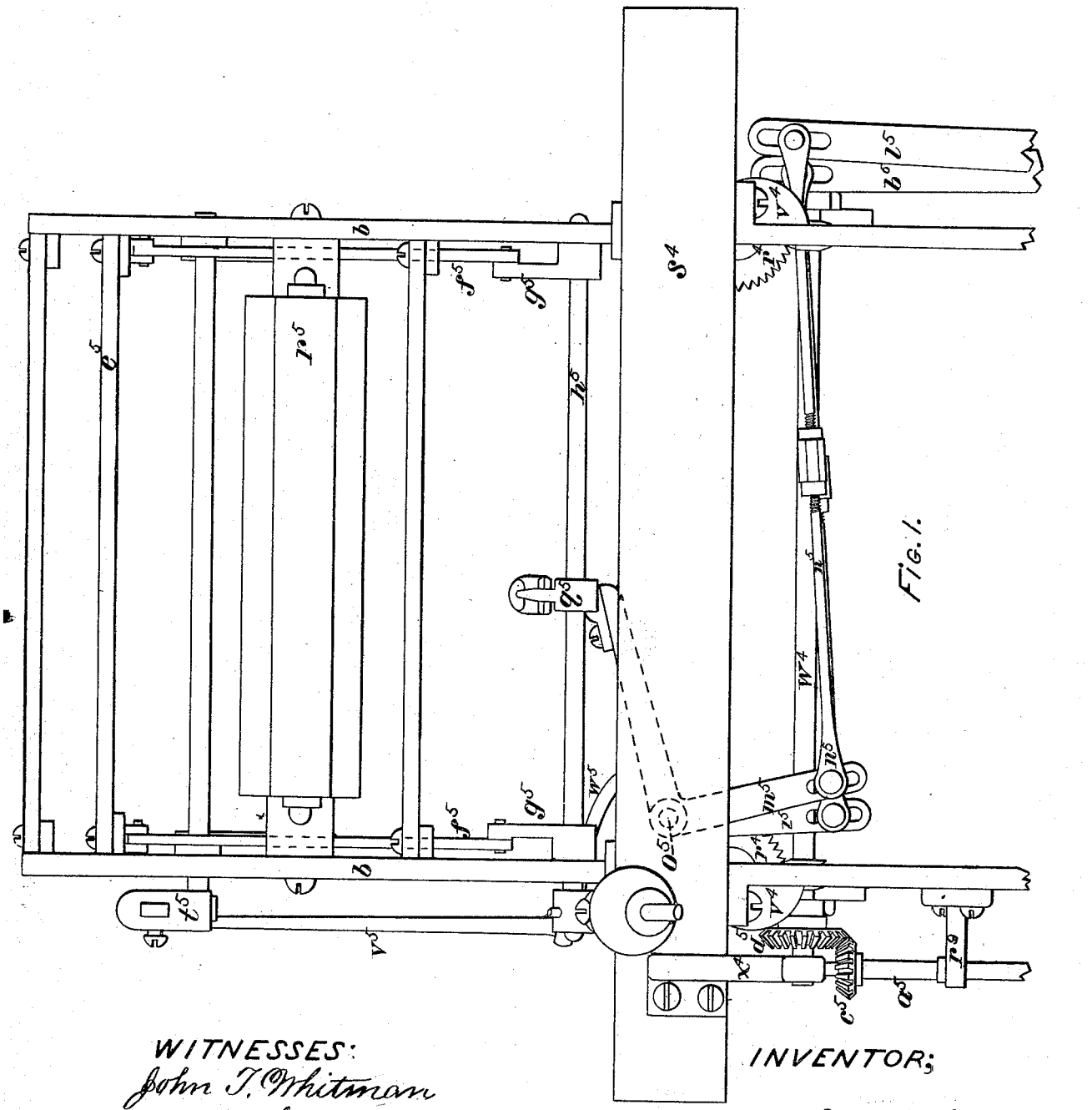
Figure 2:
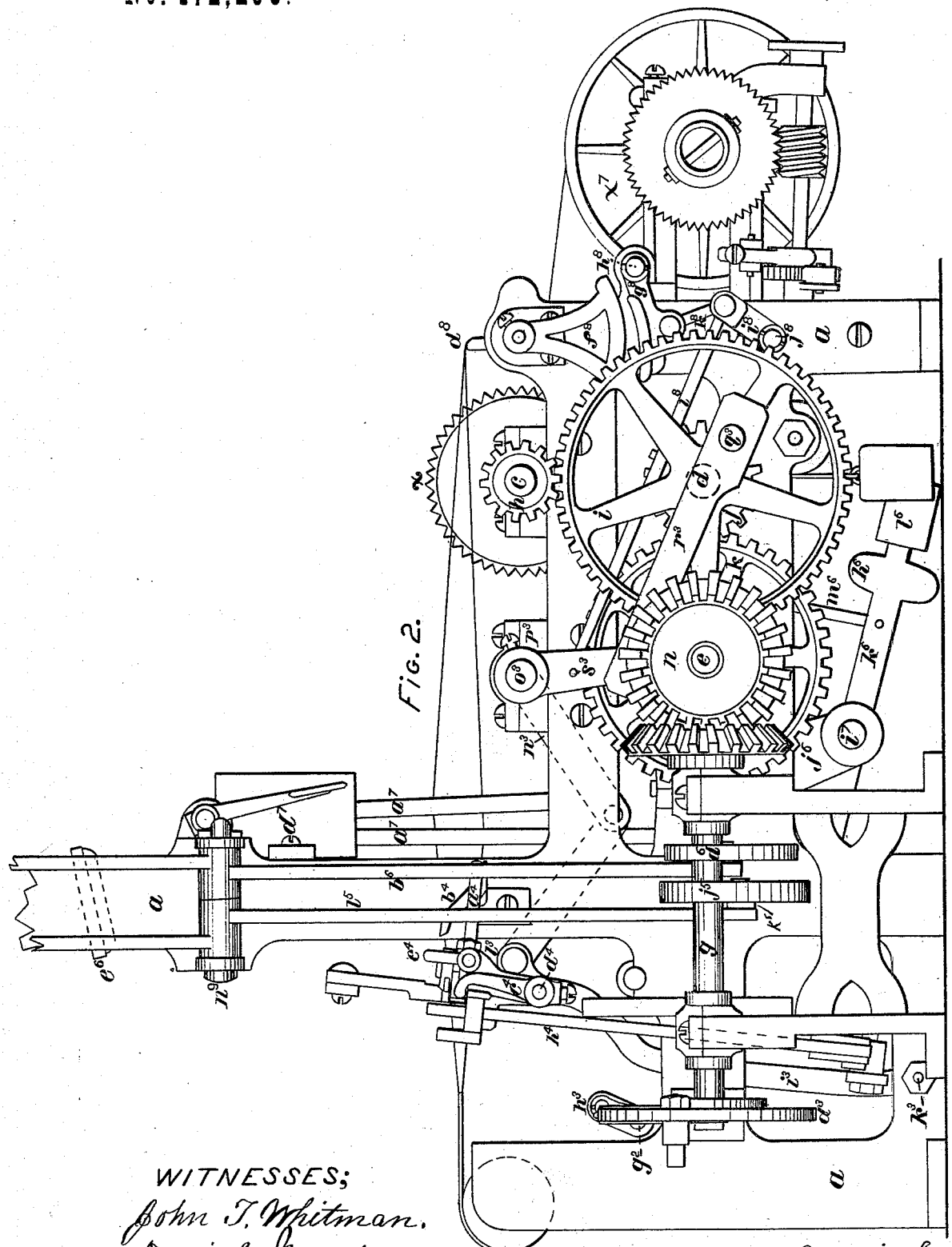

Figure 1 is a front elevation; Fig. 2, a right-hand end elevation; Fig. 3, a left-hand end elevation; and Fig. 4, a plan, each view occupying two sheets. The other figures are detached views of certain parts of the mechanism.

The various parts of the loom-frame are marked $a$, and the frame of the jacquard-machine $b$. The driving-shaft is marked $c$, the lay-shaft $d$, the cam-shaft $e$, the heddle-shaft $f$, and the shaft which actuates the jacquard-machine and the pile-wire mechanism $g$. A gear, $h$, engages a gear, $i$, and turns the shaft $d$. A gear, $j$, engages a gear, $k$, and turns the shaft $e$. A gear, $l$, engages a gear, $m$, and turns the shaft $f$, and a miter-gear, $n$, engages a similar gear and turns the shaft $g$, the shafts $e$ and $g$ having one revolution to two of the shaft $d$, and the shaft $f$ one revolution to two of the shaft $e$.

The mode of driving, reversing, and stopping the loom will now be described. The driving-pulley $o$ is engaged and disengaged with the driving-shaft to move and to stop the loom by means similar to those described in my patent for improvements in power-looms, dated February 9, 1869, and numbered 86,805. The reversing mechanism herein to be described is also similar, in some respects, to that therein set forth, though its construction and the mode of bringing it into action constitute important improvements.

The reversing mechanism consists of a roller, $p$, an axis, $q$, gears $r$ and $s$, a stud, $t$, and a lever-arm, $u$, which carries the several parts just indicated, and is capable of oscillating on a stud, $v$, affixed to the loom-frame. A plan of this mechanism is given in Fig. 5, and an elevation of the side nearest the loom in Fig. 6. The axis $q$ revolves in a pipe-box, $w$, formed on the lever-arm $u$, and carries the roller $p$ and gear $r$, while the gear $s$ is supported by the stud $t$; the object of the last-mentioned gear being to change the direction of motion. The reversing mechanism is so located with respect to the driving-shaft that when it is raised to a certain point the gear $s$ engages a gear, $x$, affixed to the driving-shaft, and the roller $p$ presses against a roller, $y$, affixed to the driving-pulley, and so long as the two rollers are held in firm contact a reverse movement will be imparted to the loom, and when they are separated that movement ceases, and the reversing mechanism becomes stationary until it is again brought into action. The pipe-box $w$, before mentioned, rests in a fork formed on the upper end of a vertical bar, $z$, which, at its lower end, is jointed to the horizontal arm of an elbow-lever, $a^2$, which oscillates on a fixed stud, $b^2$, and has its depending arm connected with the upright arm of a treadle-lever, $c^2$, by a rod, $d^2$. The treadle-lever $c^2$ oscillates on a stud, $e^2$, and is widened out at its forward end to receive the foot of the weaver.

When the weaver wishes to give a reverse movement to the loom she, with her foot, presses down the forward end of the treadle-lever, which, through the connections just indicated, raises the reversing mechanism and puts it in action; then, when she wishes the reverse movement to cease, she removes her foot from the treadle-lever, and the reversing mechanism falls out of action by its own weight.

The loom-shipper is marked $f^2$, and is capable of oscillating on the outer end of a shaft, $g^2$, as on a fixed stud. Though moving toward and from the lay of the loom, its upper end plays in a slot, $h^2$, as is usual, and is forced forward to stop the loom by a spring, $i^2$. The means by which it engages and disengages the driving-pulley with the driving-shaft may be the same as that described for that purpose in the patent above referred to.

The mode of applying the brake for arresting the movement of the loom is as follows: The brake, which is marked $j^2$, oscillates on a fixed stud, $k^2$, and acts on a brake-wheel, $l^2$, on the driving-shaft, as is usual. It is brought into action and released by a toggle-joint arrangement, consisting of an elbow-lever, $m^2$, which oscillates on a fixed stud, $n^2$, and a link, $o^2$, which is jointed at its forward end to the brake, and at its rear end to the horizontal arm of the elbow-lever. The depending arm of the elbow-lever is connected by a rod, $p^2$, with an upright lever-arm, $q^2$, affixed to the shaft $g^2$, so that when the shaft $g^2$ is turned toward the front of the loom, it presses the brake against the brake-wheel, and when it is turned in the opposite direction, it withdraws the brake from the brake-wheel. The shaft is turned to bring the brake into action by the shipper, and in order that the brake may be released while the shipper is at rest, as is required to be done when the reversing mechanism is brought into action, or when the loom is turned by hand, the shipper is engaged and disengaged with the shaft, as follows, viz.: The shipper has an arm, $r^2$, depending obliquely from it, to which a lock-lever, $s^2$, is jointed, as represented in Figs. 7 and 8. A spur, $t^2$, projects from the inner side of said lock-lever, which, by the pressure of a spring, $u^2$, locks into a notch, $v^2$, in an arm, $w^2$, affixed to the shaft $g^2$. The arm $w^2$ and a releasing-lever, $x^2$, now to be described, are shown in Fig. 9, with the shipper removed. The releasing-lever oscillates on a fixed stud, $y^2$, and has a slot, $z^2$, formed in its lower end, as represented in the figure just mentioned. A roller carried by a stud, $a^3$, affixed to the treadle-lever $c^2$, plays in said slot, and oscillates the releasing-lever when the treadle-lever is oscillated.

When the upper arm of the releasing-lever is moved forward, a cam-surface, $b^3$, acts on the lower end of the lock-lever $s^2$, and withdraws the spur $t^2$ from the notch $v^2$, and thus disconnects the shipper from the shaft, while the upper end of the releasing-lever strikes a projection, $c^3$, on the arm $w^2$, and turns the shaft a sufficient distance to withdraw the brake from the brake-wheel. Now, suppose the loom to be thrown out of gear, and the weaver desires to release the brake from the brake-wheel and set the loom free, she presses the treadle-lever down a certain distance, and thereby disconnects the shipper and releases the brake, as just explained; and if she also wishes to reverse the movement of the loom, she presses the treadle-lever down still farther, and thus brings the reversing mechanism into action.

When the loom is suddenly stopped, the recoil of the mechanism farthest from the driving shaft is such as to sometimes displace some of its parts, especially to disengage a pile-wire from the withdrawing-hook. To prevent this effect I apply a brake to the shaft which actuates the wire-operating mechanism, which acts simultaneously with the brake applied to the driving-shaft just described.

In my application for a patent for improvements in looms for weaving piled fabrics, filed July 14, 1875, the specification describes a wire-operating mechanism actuated by a shaft similar to the shaft $g$, before designated. To this shaft a wheel, $d^3$, is affixed, which serves as a brake-wheel, and carries the crank-stud for operating the withdrawing-hook. On a fixed stud, $e^3$, a brake, $f^3$, oscillates, which acts on the wheel $d^3$, and is jointed at its inner end to a link, $g^3$, which is jointed at its upper end to a crank-arm, $h^3$, affixed to the shaft $g^2$. When the shaft is turned to apply the brake to the driving-shaft, it at the same time brings the brake $f^3$ into action, and when it is turned in the opposite direction, it releases both of the brakes simultaneously.

The mode of operating the lay of the loom, which has what is technically called a "double-beat" movement may be understood as follows: The swords $i^3$ of the lay, which carry the race-beam $j^3$, oscillate on studs $k^3$, as is usual. On the rear sides of the swords lugs $l^3$ are formed, to which the forward ends of connecting-bars $m^3$ are, respectively, jointed, while the rear ends of said connecting-bars are jointed to the ends of the lever-arms $n^3$, which are affixed to a shaft, $o^3$, which oscillates in fixed bearings $p^3$.

From this description it will be seen that an oscillating movement of the shaft will impart a vibratory movement to the lay, and that when the lever-arms are depressed, as represented in the drawings, they will put the lay in its backward position, and that when they are elevated so as to bring the axes of the several parts in a line, they will put it in its forward position, and thus give the first beat; then when the lever-arms are elevated still further to a position indicated by dotted lines in Fig. 10, they will draw the lay back a correspondingly short distance, and by their return movement give it the second beat, thus giving to the lay two beats at each oscillation of the shaft.

Heretofore the required oscillating movement has been given to the shaft by two cranks formed on a crank-shaft located below the lever-arms, and, respectively, connected therewith by suitable connecting-bars.

In my improved mode of operating the lay only one crank is required, which, being located outside of the loom-frame, is more accessible, as well as more simple in its construction, than the double crank-shaft located inside the loom-frame. It may be described as follows, viz: a crank-wrist, $q^3$, is carried by the gear $i$, before designated, and is connected by a bar, $r^3$, to a depending arm, $s^3$, which is affixed to the shaft $o^3$.

It will be readily seen that by these means the crank-wrist $q^3$ will impart one oscillation to the shaft $o^3$ at each of its revolutions.

The mode of constructing and operating the shuttle-binder will now be described. This part of my invention has for its object to arrest the shuttle at the termination of its movement without a shock, and to relieve it from the bite of the binder before it is thrown. The means of accomplishing this object consist, in part, in giving to the shuttle-binder somewhat the quality of a spring, and holding its swinging end rigidly when the shuttle is completing its movement into the shuttle-box, and liberating it before the shuttle is thrown.

Fig. 11 is a plan, and Fig. 12 a rear view, of the right-hand shuttle-box; and Fig. 13 is an end view of the same on an enlarged scale.

The shuttle-race and the front part of the shuttle-box are constructed as usual. The shuttle-binder is marked $t^3$, and has one end of it pivoted at $u^3$ to the rear side of the shuttle-box $v^3$, while the other end is capable of swinging a limited distance toward and from the shuttle-box. A spring, $w^3$, presses it toward the shuttle-box and against the outer end of the part $v^3$, to which it is pivoted, which limits its movement in that direction. In the rear of the shuttle-box an axis, $x^3$, is placed, which oscillates in bearings $y^3$ affixed to the race-beam. From the front side of the axis an adjustable arm, $y^8$, projects, which engages another arm, $z^3$, projecting from the rear side of the shuttle-binder when the shuttle enters the shuttle-box. From the rear side of the axis a lever-arm, $a^4$, extends with its end bent toward the loom to bring it over a stationary cam-surface, $b^4$, (see Figs. 3 and 11,) which acts upon it. To stop the loom when a shuttle fails to enter the shuttle-box the shuttle-binder acts on a lever-arm, $c^4$, affixed to the protecting-rod $d^4$, as is usual. When a shuttle enters the shuttle-box it strikes the swelled part of the shuttle-binder, and when it has pushed it back a sufficient distance to operate the protecting-rod the arm $z^3$ strikes against the arm $y^8$ and rigidly holds the swinging end of the binder, while the spring-action of the binder gradually arrests the shuttle; then as the lay moves forward to beat up the cloth the cam-surface $b^4$ elevates the arm $a^4$, withdraws the arm $y^8$ from the arm $z^3$, and thus liberates the binder and sets the shuttle free preparatory to its being thrown. To enable the weaver to release the shuttle-binder when the loom is at rest a handle, $e^4$, is affixed to the axis $x^3$, by which she may readily turn the axis.

The picking mechanism may be described as follows: A front view of it as applied to the left-hand end of the loom is given in Fig. 14, and a plan thereof in Fig. 15, with a section of the loom-frame and of the lay. A balancing-lever, $e^9$, oscillates on a stud, $f^4$, carried by the sword of the lay $i^3$, and has a weight, $g^4$, formed on its inner arm, while to its outer arm the lower end of the picker-staff $h^4$ is pivoted. The upper end of the staff traverses a slot in the race-beam and is maintained in a proper horizontal plane while moving toward and from the cloth by a link, $i^4$, as is usual. The object of the weight $g^4$ is not only to counterbalance the weight of the picker-staff and the arm of the lever to which it is pivoted, but also to carry the picker-staff, or assist in carrying the picker-staff, back to the outer end of the shuttle-box during the latter part of its movement after it has thrown a shuttle. The weight of the picker-staff and of the lever-arm to which it is pivoted, when not counterbalanced, absorbs to some extent the force of the picker-staff in throwing the shuttle after the picker-staff has passed a vertical position. The picking-shaft $j^4$ oscillates in bearings $k^4$ affixed to the loom-frame, and has an arm, $l^4$, depending from it, which is connected by a strap, $m^4$, to the picker-staff.

When the picking-shaft is not in action it is held in one direction by the arm $l^4$ resting against the loom-frame, as shown in Fig. 14, while it is free to turn in the opposite direction. An arm, $n^4$, extends horizontally, or nearly so, from the picking-shaft, against which an arm, $o^4$, on the cam-shaft $e$, strikes to throw the shuttle.

From the above description it will be seen that if the arm $n^4$ was firmly affixed to the picking-shaft the movement of the loom could not be reversed, as the arm $o^4$, striking against the arm $n^4$, would arrest it. To overcome this difficulty the arm $n^4$ is made capable of yielding under the action of a coiled spring, $p^4$, in the direction in which the arm $o^4$ moves when the movement of the loom is reversed, and is made rigid in the opposite direction by its resting against a stop, $q^4$, affixed to the picking-shaft. By limiting the movement of the picking-shaft in one direction, and making the arm $n^4$ yielding, as above explained, the motion of the loom may be reversed without withdrawing the shuttle from its shuttle-box.

The mode of operating the jacquard-machine, and of adjusting its elevation relative to the loom, will now be described.

One object of this part of my invention is to facilitate the raising and depressing of the jacquard-machine, to adjust the height of the harness-cords as they are contracted or extended by atmospheric or other causes. The jacquard-machine may be constructed and the harness-cords arranged as is usual. The beams which support the mechanism on which it rests are marked $s^4$. (See Figs. 2, 3.) It is guided in its up and down movements by four guide-stands, $t^4$, affixed to the beams just mentioned. In these stands suitable bearings are formed, in which two shafts, $w^4$, turn, which carry at each of their outer ends a cam, $v^4$, on which the feet of the machine rest. To the rear ends of each of these shafts a screw-gear, $r^4$, is affixed, and a horizontal shaft, $w^4$, supported by bearings $x^4$, carries two screws, $y^4$, which, respectively, engage the screw-gears. The cams $v^4$, and the screws and screw-gears which turn the shaft that carry them, are right-and-left handed, in order that the tendency of the weight of the jacquard-machine to turn the shafts may be counteracted. When the shaft $w^4$ is turned in one direction it will raise the jacquard-machine, and when it is turned in the opposite direction it will depress it. Heretofore the operator has turned the shaft $w^4$ for these purposes by a hand-wheel affixed to it, which, being considerable above his reach when standing on the floor of the mill, he is obliged to ascend by steps or otherwise to a height at which he can reach it. To obviate this inconvenience I combine with the mechanism just described a depending shaft, to the lower end of which the hand-wheel is affixed, said depending shaft being of sufficient length to bring the hand-wheel within easy reach of the operator when standing on the floor. The hand-wheel is marked $z^4$, and the depending shaft $a^5$, which shaft is supported by the stand $x^4$ affixed to the beam $s^4$, and another stand, $r^9$, affixed to the loom-frame. The upper end of the shaft carries a bevel-gear, $c^5$, which engages a bevel-gear, $d^5$, affixed to the shaft $w^4$, and thus transmits the motion of the shaft $a^5$ to the shaft $w^4$.

The trap-board of the jacquard-machine is marked $e^5$, and is connected by bars $f^5$ with lever-arms $g^5$ extending from a shaft, $h^5$, which oscillates in bearings $i^5$ supported by the frame of the machine. The trap-board is elevated and depressed by oscillating the shaft $h^5$, as is usual. The means which I employ to oscillate it, and to which this part of my invention relates, may be described as follows: A cam, $j^5$, carried by the shaft $g$, before mentioned, acts on a cam-roller, $k^5$, which is pivoted to the lower end of an upright lever, $l^5$, which oscillates on a fixed axis, $n^9$, and at its upper end is connected with the depending arm of an elbow-lever, $m^5$, by a horizontal rod, $n^5$. The elbow-lever $m^5$ oscillates on an axis, $o^5$, while a bar, $p^5$, connects its horizontal arm with a lever-arm, $q^5$, extending from and affixed to the shaft $h^5$, the ends of the bar $p^5$ being attached to their respective arms by a ball-and-socket joint. It will be seen that by connecting the upright lever $l^5$ with the depending arm of the elbow-lever $m^5$ on a horizontal or nearly horizontal plane, the jacquard-machine may be elevated and depressed, as above explained, without the necessity of varying the length of the connecting-rod. Now, suppose the trap-board to be in its lowest position, and the cam-roller resting on the part of the cam having the smallest diameter, it will be obvious that, as the cam moves forward and carries the cam-roller out to the part of the cam having the largest diameter, it will raise the trap-board to its highest position, as it is represented in the drawings, then, as the cam continues its movement, and the cam-roller is returning to its supposed first position, the trap-board will descend by its own gravity.

The card-cylinder $r^5$ receives its reciprocating movement from an oscillating shaft, $s^5$, and is drawn against the ends of the needles by a weight, $t^5$, on a lever-arm, $u^5$, as is usual. A bar, $v^5$, connects the lever-arm $u^5$ with another lever-arm, $w^5$, which oscillates on a stud, $x^5$, supported by the frame of the jacquard-machine. The lever-arm $w^5$ carries a roller, $y^5$, which rests on the horizontal arm of an elbow-lever, $z^5$, as represented in Fig. 16. The depending arm of the elbow-lever $z^5$ is connected by a horizontal rod, $a^6$, to the upper arm of an upright lever, $b^6$, which oscillates on the axis $n^9$, before mentioned, and carries a cam-roller, $c^6$, at its lower end, on which a cam, $d^6$, acts. The cam $d^6$ raises the weight $t^5$, and draws the card-cylinder away from the needles in a manner similar to that in which the cam $j^5$ raises the trap-board, as before explained.

I will now describe the mode of operating the comber-board. The object of this part of my invention is to diminish the motive power required to drive the loom; to prevent the weight of that portion of the jacquard-harness which is raised by the comber-board from pushing the loom forward when it descends, whereby the loom in that stage of its operation may be more easily stopped; and also to form a more even shed. Fig. 17 is a sectional view of this part of the mechanism, looking toward the right-hand end of the loom. The comber-board, as is well known, is employed to raise the weight suspended from the harness-cords of the jacquard-machine. It is marked $e^6$ in the drawings, and is represented in its elevated position.

The harness-cords pass from the jacquard-machine down through the comber-board, and have weights suspended from them, and knots formed on them by which they are lifted by the comber-board, as is usual; and as the mounting of the jacquard harness-cords is well known it is deemed unnecessary to represent them in the drawings. When the comber-board descends to its lowest position, the harness-cords are left suspended from the jacquard-machine, and made tense by their respective weights, then as the weights are raised by the comber-board acting on their knots their upper portion is slackened and hangs loosely. In order that the trap-board may properly trap the cords, it is necessary that they should be tense at the time the trapping operation takes place; consequently at that time the comber-board is made to descend below the knots on which it acts, thus leaving the cords and weights suspended from the jacquard-machine.

It will thus be seen that the weight of the harness is alternately shifted from the jacquard-machine to the comber-board, and vice versa, according as the comber-board is elevated or depressed. If, under these conditions, a counter-balance weight, acting in the direction of the motive power, is applied to the comber-board to counterbalance the weight of the harness, a shock to the mechanism will be produced when the weight of the harness is shifted from the comber-board to the jacquard-machine, by the sudden change in the direction in which the counter-balance weight will press on the cam which actuates it. Instead, therefore, of applying the counter-balance weight so as to act in the direction of the motive power, I apply it so as to act in the opposite direction, whereby it presses on the cam constantly in one direction, its size being sufficient to raise the comber-board and the harness-weights connected with it. A shaft, $i^7$, extends across the loom, and oscillates in bearings $j^6$ affixed to the loom-frame. From its rear side two lever-arms, $k^6$, extend and carry the counter-balance weight $l^6$. For convenience, I sometimes place this weight below the floor of the mill, and support it by chains affixed to the upper ends of the segments $h^6$ of the lever-arms. One of these lever-arms is connected by an adjustable rod, $m^6$, to a lever-arm, $n^6$, which oscillates on a stud, $o^6$, affixed to the loom-frame, and carries a cam-roller, $p^6$, on which a cam, $q^6$, on the shaft $e$ acts, to raise and depress the weight. From the front side of the shaft $i^7$ two lever-arms, $r^6$, also extend, to the ends of which the lower ends of bars $s^6$ are respectively jointed, while the upper ends of said bars are similarly jointed to stands $t^6$, which are affixed to the under side of the comber-board. These stands carry rollers $u^6$, which traverse suitable grooves in guide-stand $v^6$, and thus guide the comber-board in its vertical movements.

It will be obvious from this description that when the counter-balance weight descends the comber-board will be elevated, and when the counter-balance weight is elevated the comber-board will descend; that the pressure of the counter-balance weight on the cam will always be in one direction; and that by counterbalancing the weight of the harness less power will be required to drive the loom than when it is not counterbalanced. It will be obvious also that, as the gravitating force of the counter-balance weight is somewhat greater than that of the harness-weights, the tendency of this arrangement will be to retard the loom rather than to accelerate it when the harness-weights descend, and that consequently the movement of the loom can be easily arrested when thrown out of gear.

To aid in forming an even shed I put the comber-board in an oblique position when it is elevated—that is, raise its rear edge higher than its front edge is raised, thus bringing the eyes of the jacquard-harness, respectively, to a line corresponding to the angle of the shed. This is effected as follows:

Affixed to the stands $t^6$, before mentioned, are depending arms $w^6$, which carry rollers $x^6$, which ply in grooves $y^6$ formed in guide-stands $z^6$ affixed obliquely to the loom-frame. When the comber-board is elevated the rollers $x^6$ will tip it in accordance with the angle given to the guide-stands, and when it is depressed they will return it to its former position.

The mode of operating the heddle-frames may be described as follows: The object of this part of my invention is to impart a more positive and steady movement to the heddle-frames than is imparted by the usual strap-connections. A sectional elevation of the heddle-frames, and the mechanism which operates them, is given in Fig. 21, looking toward the right-hand end of the loom. The heddle-frames, to which the heddles may be applied as is usual, are marked $a^7$, and though only two of them are represented a greater number of them may be used, and, as each frame is actuated by a separate mechanism, which is common to all the others, only one of them need be described. On the upper corners of the frame projections $b^7$ are formed, which ply in grooves $c^7$ in fixed stands $d^7$, and guide the frame in its vertical movements. To the lower edge of the frame the upper ends of rods $e^7$ (there being two for each frame) are firmly affixed, while their lower ends are jointed, respectively, to lever-arms $f^7$ affixed to an oscillating shaft, $g^7$, which is supported by fixed bearings $h^7$. From the same shaft another lever-arm, $j^7$, extends, in the end of which a slot, $l^7$, is formed. On a fixed stud, $m^7$, a lever-arm, $n^7$, oscillates, and also has a slot, $o^7$, formed in its end. A stud, $p^7$, is affixed to each of said lever-arms in such manner as to be capable of adjustment in their respective slots, the two studs being connected by an adjustable rod, $q^7$, which is provided with a right and left handed nut, $r^7$. The lever-arm $n^7$ carries a cam-roller, $s^7$, on which a grooved cam, $t^7$, acts, and raises and depresses the heddle-frame.

It will thus be seen that as all the connections between the cam and the heddle-frame are of a rigid character, they will impart a steady movement to the heddle-frame, and will rarely require adjustment. The heddle-frame may be easily adjusted to a higher or lower position by turning the nut $r^7$, and the range of its movement may be increased or diminished by moving the studs $p^7$ toward and from the axis of their respective lever-arms. The weight of the heddle-frames may be counterbalanced by a weight, $u^7$, suspended by a strap, $v^7$, which passes over a pulley, $w^7$, and is affixed to the lever-arm $j^7$ before mentioned.

The part of my invention which relates to the construction of the warp-beam consists in making the warp-beam wholly of cast metal, either iron or steel, (steel being preferred when lightness is an object,) and casting its barrel and its bearings hollow and in one piece, and screwing the beam-heads against shoulders formed on the ends of the barrel.

The warp-beam is marked $x^7$ in the drawings, and is represented as applied to the loom in Figs. 2, 3, and 4. Its several parts are represented in detached views, in which Fig. 18 is a view of the barrel and the bearings of the beam as cast in one piece, Fig. 19 a view of the beam-head, and Fig. 20 a longitudinal section of the beam, showing the hollow cavity in the barrel and in the bearings, and the mode in which the heads are affixed to the barrel. The barrel of the beam is marked $y^7$, and its bearings $z^7$, both parts being cast in one piece with an interior cavity, $a^8$, as seen in Fig. 20. The beam-heads are marked $b^8$, and the shoulders on the barrel, to which they are affixed, $c^8$, respectively. The heads $b^8$ are screwed to the shoulders $c^8$, as is shown in the figure just referred to.

The part of my invention which relates to the mode of constructing and of operating the brake which holds the tension-bar rigid at the time the lay beats up the weft, will now be described. It is especially applicable to looms having a double-beat lay motion, such as is hereinbefore described. The brake mechanism is represented in Figs. 22 and 23, detached from the loom. In order that its application may be more readily understood, I will remark that the warp passes from the warp-beam around a guide-rod, over the tension-bar, through the heddles, to a positive take-up roller, as is usual, and as is indicated in Fig. 3. The tension-bar also, under the force of a weight, gives the required tension to the warp and regulates its delivery, as is usual.

The tension-bar is marked $d^3$, and oscillates on axes $e^8$, supported by the loom-frame. To its right-hand axis a lever-arm, $f^8$, is affixed, which terminates in the form of a segment, having a smooth face, on which a brake-lever, $g^8$, acts. The brake-lever oscillates on a fixed stud, $h^8$, and is actuated by a toggle-joint arrangement, which consists of a lever-arm, $i^8$, that oscillates on a fixed stud, $j^8$, and a link, $k^8$, the upper end of which is jointed to the brake-lever, and the lower end to the lever-arm. A connecting-bar, $l^8$, has its rear end also jointed to the lever-arm, while its forward end is pivoted to the depending arm $s^3$, which operates the lay, as before described. Hence it will be seen that when the depending arm puts the lay in its backward position, in which it is represented in the drawings, it will push the brake-lever away from the segment-lever, as shown in Fig. 22, and leave the tension-bar free; then, when it moves forward, and gives the lay its first beat, it brings the centers of the toggle-joint arrangement to a line, as shown in Fig. 23, and presses the brake-lever against the segment-lever, and holds the tension-bar rigid; then, as it continues its movement, to withdraw the lay preparatory to its second beat, it will draw the toggle-joint arrangement forward to the position indicated by the dotted lines, and release the brake, and when it returns and gives the lay its second beat, it will again bring the centers of the toggle-joint arrangement in a line, and apply the brake as before. Thus, it will be seen that the brake will be brought into action, and released at each beat of the lay.

I do not intend to confine myself to the form and arrangement of the various parts of the mechanism above described, as it will be obvious to those acquainted with the construction of looms that they may be varied without departing from the principles of my inventions.

What I claim as new, and desire to secure by Letters Patent, is as follows, viz:

1. In combination with a reversing mechanism, consisting of the roller $p$, axis $q$, gears $r$ and $s$, stud $t$, and lever-arm $u$, as herein represented and described, a treadle-lever, whereby the weaver may put the reversing mechanism in action, substantially as and for the purpose specified.

2. In combination with a brake-wheel on the driving-shaft of a power-loom, a brake and toggle-joint mechanism, such as is herein represented and described, for arresting the movement of the loom, said toggle-joint mechanism being brought into action by the loom-shipper, and disconnected from it by means substantially as described, to set the loom free, substantially as herein set forth.

3. In combination with the reversing mechanism and the treadle-lever by which it is brought into action as aforesaid, a releasing-lever, whereby the brake for arresting the movement of the loom is disconnected from the loom-shipper and withdrawn from the brake-wheel, substantially as specified.

4. In combination with the brake adapted to stop the loom, and the shaft $g$ of the wire-operating mechanism, the brake $f^3$, as and for the purpose specified.

5. The combination of mechanism herein represented and described, for operating the lay of the loom with a "double-beat" movement, consisting of a single crank, $q^3$, bar $r^3$, depending arm $s^3$, oscillating shaft $o^3$, lever-arms $n^3$, and connecting-bars $m^3$, the said single crank $q^3$, the bar $r^3$, and the depending arm $s^3$ being located outside the loom-frame, as herein set forth.

6. The combination of mechanism, herein represented and described, for holding the swinging end of the shuttle-binder rigid when the shuttle is completing its movement into the shuttle-box, and liberating it before the shuttle is thrown, consisting of the axis $x^3$, adjustable arm $y^3$, arm $z^3$, lever-arm $a^4$, and cam-surface $b^4$.

7. In combination with the mechanism herein represented and described, for elevating and depressing the jacquard-machine, the depending shaft $a^5$, whereby the hand-wheel $z^4$ is brought within reach of the operator when standing on the floor of the mill, as specified.

8. In combination with the oscillating shaft $h^5$, which elevates and depresses the trap-board of the jacquard-machine, the oscillating mechanism herein described, consisting of the cam $j^5$, upright lever $l^5$, horizontal rod $n^5$, elbow lever $m^5$, the bar $p^5$, and the lever-arm $q^5$.

9. In combination with the comber-board for elevating and depressing the jacquard-harness, as herein described, a counter-balance weight, arranged as described, whereby the comber-board is elevated, said weight being withdrawn or raised by the motive power which depresses the comber-board, substantially as specified.

10. In combination with the comber-board, the mechanism whereby it is put in an oblique position to form an even shed, as herein specified, consisting of the depending arms $w^6$, rollers $x^6$, and guide-stands $z^6$.

11. The combination of mechanism, herein described, for actuating the heddle-frames, consisting of the cam $t^7$, roller $s^7$, lever-arm $n^7$, adjustable rod $q^7$, lever-arm $j^7$, oscillating shaft $g^7$, connecting-rod $e^7$, and lever-arms $f^7$.

12. And, in combination with a tension-bar which gives tension to the warp and regulates its delivery, a brake and toggle-joint mechanism for holding said tension-bar rigid while the lay beats up the weft, and a lay having a "double-beat" movement, substantially as specified.

ERASTUS BRIGHAM BIGELOW.

Witnesses:
JOHN T. WHITMAN,
DANIEL MERRIMAN.